United States Patent [19]
Longmore et al.

[11] Patent Number: 5,245,984
[45] Date of Patent: Sep. 21, 1993

[54] SOLAR DOMESTIC HOT WATER SYSTEM WITH THERMAL SIPHON PREHEATING

[76] Inventors: Morley Longmore, 14262 Meadow Dr., Grass Valley, Calif. 95945; Bob Pelton, 13339 Dog Bar Rd., Grass Valley, Calif. 95949

[21] Appl. No.: 780,049

[22] Filed: Oct. 21, 1991

[51] Int. Cl.[5] .............................................. F24J 2/44
[52] U.S. Cl. .................................. 126/639; 126/609; 126/641; 126/646
[58] Field of Search ............... 126/435, 437, 434, 427, 126/422, 400, 609, 639, 614, 610, 616, 634, 628, 640–643, 646, 638

[56] References Cited

U.S. PATENT DOCUMENTS

| | | | |
|---|---|---|---|
| 4,050,626 | 9/1977 | Awalt, Jr. ............... | 126/400 |
| 4,128,124 | 12/1978 | Worthington ........... | 126/427 |
| 4,273,102 | 6/1981 | Anthony ................. | 126/435 |
| 4,471,762 | 9/1984 | Levine .................... | 126/437 |
| 4,562,828 | 1/1986 | Koskela ................. | 126/435 |
| 4,644,934 | 2/1987 | Kaus ...................... | 126/435 |

FOREIGN PATENT DOCUMENTS 53537  4/1977  Japan ................................ 126/435

Primary Examiner—James C. Yeung
Attorney, Agent, or Firm—Mark C. Jacobs

[57] ABSTRACT

A solar energy based domestic hot water system which employs a columnar-type heat exchanger designated as a thermal booster having two columns, through one of which passes extremely warm water coming from the output of a solar collector to prewarm colder water coming from the solar storage tank and passing through the second of which columns, on its way to the conventional electric or gas domestic hot water heater. The thermal booster warms the water in the second column primarily during periods when no hot water faucet in the hot water delivery system is in an actuated condition. Optionally a coil heater exchanger may be disposed in the upper section of the storage tank to warm entering cold water from the cold water inlet source prior to its passage through the second pipe as above on its route to the domestic hot water heater. Operation of the system requires minor modification of the domestic hot water heater of the system at its input pipe and by the inclusion of an extra value controlled outlet.

15 Claims, 3 Drawing Sheets

SOLAR DOMESTIC HOT WATER SYSTEM WITH THERMAL SIPHON PREHEATING

BACKGROUND OF THE INVENTION

In this the age of energy conservation, man is desirous of taking whatever steps can be had on a reasonable cost basis to maximize energy utilization. In the field of domestic hot water systems, solar energy based systems are not new. They, like the standard fossil fuel fired or electric hot water systems, suffer from efficiency losses of up to 30 percent. Witness the high growth in the use of insulation or blankets around gas or electric hot Water heaters.

Even today, solar based systems are still used as a supplement to a conventional DHWS, (domestic hot water system) rather than as the sole source of heat. This is true for several reasons the most important of which is the fact that many days are cloudy or rainy in many parts of the country thereby rendering a solely solar system impractical.

Thus, even on sunny days, the solar system acts as a first stage heater from which the water goes to intermediate storage and the electric or gas DHWS heats the stored water to tap level temperature.

It is one object of this invention to provide a more efficient solar based domestic hot water system.

It is another object to provide a solar based DHWS wherein the heat gain from solar energy is used to preheat the water entering from the storage tank to the electric or gas hot water heater (EOGHWH).

It is a further object to provide a solar based DHWS that employs a thermal siphon.

It is a still further object to provide a solar based domestic hot water system wherein heat gained by water exiting the solar collector is used to prewarm water going from the solar heated water's storage tank to the EOGHWH to drive the siphon.

It is a yet further object to provide a solar based DHWS wherein the EOGHWH has two inlet sources.

An additional object is to provide a solar based DHWS wherein the EOGHWH has two outlets, one at the top and one at the bottom.

These and other objects of the invention will in part be obvious and will in part appear hereinafter.

The invention accordingly comprises the apparatus possessing the features, properties and the relation of components which are exemplified in the following detailed disclosure and the scope of the application of which will be indicated in the claims.

For a fuller understanding of the nature and objects of the invention reference should be made to the following detailed description taken in conjunction with the accompanying drawings.

SUMMARY OF THE INVENTION

A solar based domestic hot water system wherein heat gained by water exiting the solar collector is used to indirectly heat the standing water in the EOGHWH through the action of the device of this invention.

DESCRIPTION OF THE PREFERRED EMBODIMENT

Figure 1:
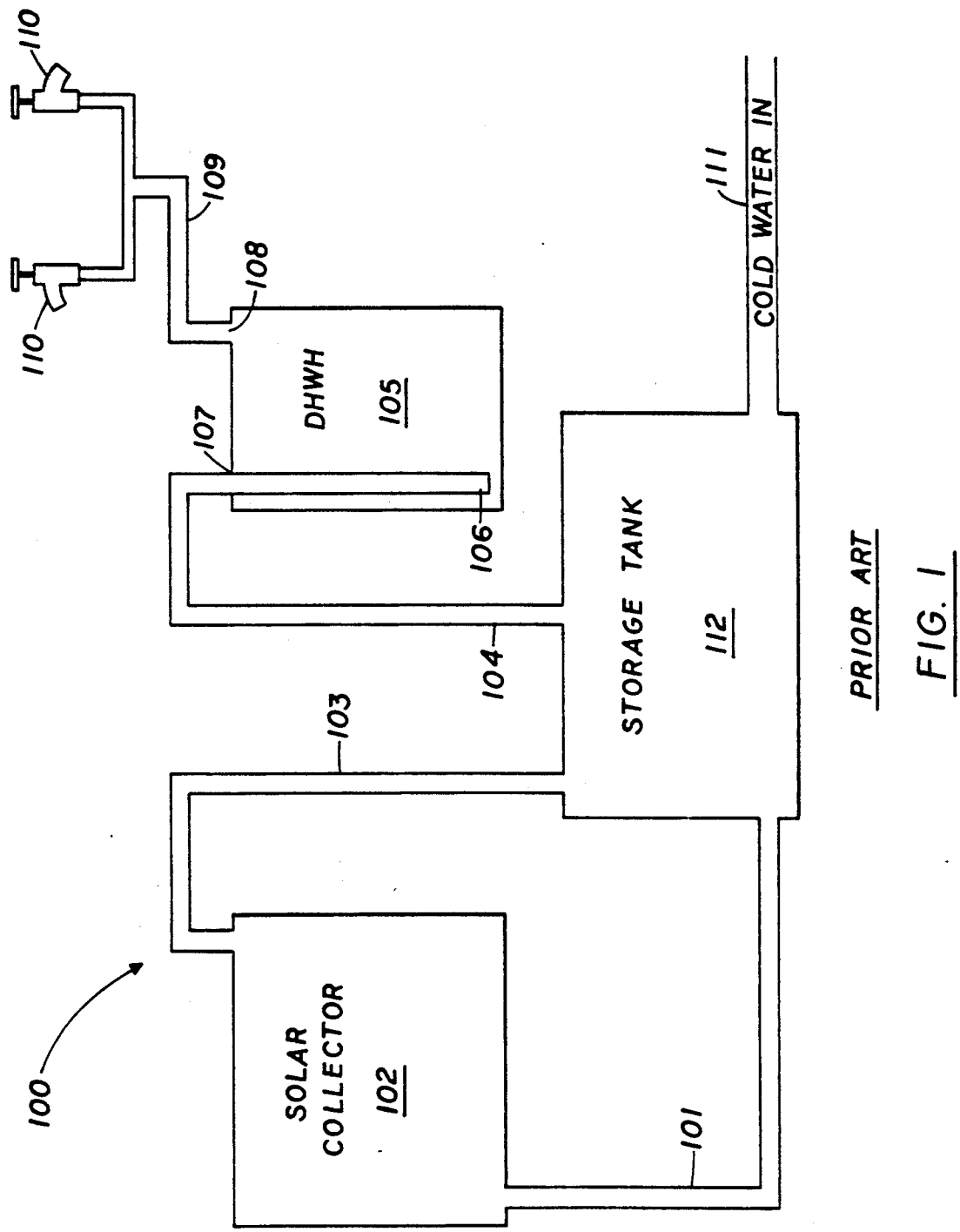
FIG. 1 is a diagrammatic view of a conventional prior art solar based domestic hot water system.

In FIG. 1 there is shown a diagrammatic view of a conventional DHWS 100 that employs solar energy. Here the storage tank 112 has an outlet line 101 connected from adjacent the bottom of the tank to the solar collector 102. The collector in turn is connected on its outlet side back to the top of tank 112 via line 103 in a loop. The inlet from the municipal water supply to this tank 112 is entry line 111.

A second pipe 104 emerges from the top of the tank 112 and enters the EOGHWH 105 at the top at opening 107, but the liquid does not egress from the pipe extension 106 of pipe 104 until the bottom of the DHWH (Domestic Hot Water Heater). Opening 108 at the top of the DHWH is the junction for pipe 109 that leads to one or more hot water faucets 110, throughout the dwelling or other structure.

In this prior art structure the operating principle is that cold water comes in from its source, to a storage tank 112, the cold water enters the tank at the bottom and leaves at the bottom to the collector. After being heated in the collector the warmed water returns to the same storage tank, 112, but at the top thereof. Water is then piped to the DHWH where though warmed somewhat, it enters at the bottom. This water is then heated to a pre-set hot water temperature and moves by household pressure from the heater to the various faucets of the structure.

Figure 2:
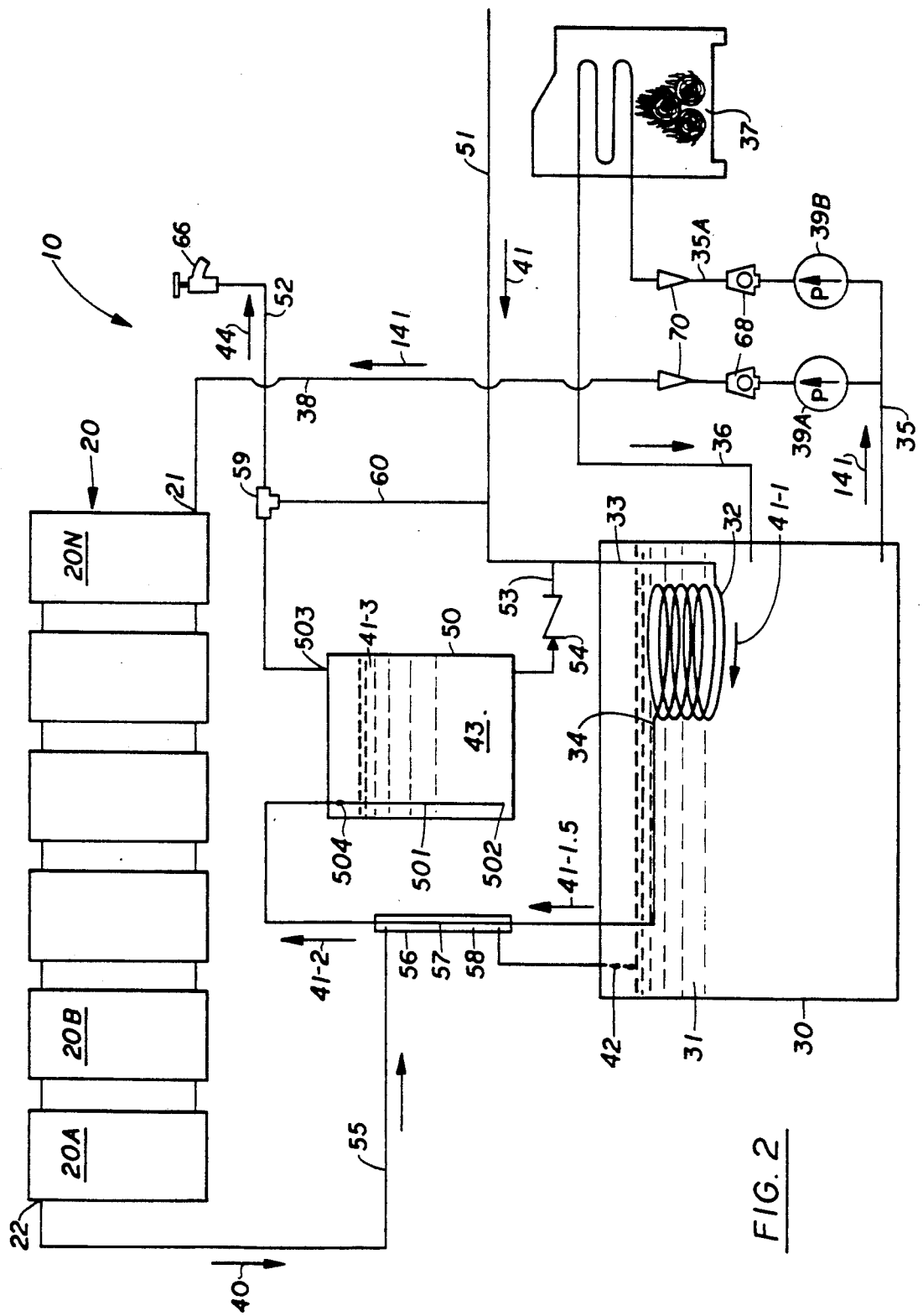
FIG. 2 is a diagrammatic view of the DHWS of this invention.

The reader should now turn to FIG. 2 for the details of the present invention, system 10 and how the system differs from that of the prior art conventional solar based DHWS. Here cold water 41 enters indirectly into a non-pressurized storage tank, 30, (similar to tank 112) via cold water inlet pipe 51. This pipe is under pressure and is fluidly connected to pipe 33, the inlet of heat exchanger 32, a conventional tubular heat exchanger, well known in the art disposed in said tank 30 which tank itself is open at the top and not under any pressure other than atmospheric. At this first stage the water 41 is thus slightly warmed Within the coil heat exchanger, 32 if this storage tank has a water temperature that is higher than ambient. Water 41 then becomes designated 41-1. The water within the storage tank 30 itself is designated 31. The outlet 34 of the heat exchanger 32 is connected to the pipe 57 of thermal booster 56. Note that source cold water 41 is not introduced into tank 30 but is routed through the heat exchangers and DHWH.

The thermal booster 56 is also a heat exchanger but of the jacket type. That is, an outer pipe 58 which is an annular pipe surrounds an internal narrower diameter pipe here 57, through which flows a fluid of either a hotter or colder temperature. In a conventional heat exchanger, fluid flowing in one direction, heats or cools fluid in either the outer or inner jacket to change the temperature and move both fluids toward an equilibrium. Here, however, the object is to heat the fluid standing in the other pipe. Usually, one fluid flows in one direction while the other fluid flows in the opposite direction. The operating principle is that of temperature equalization. In this invention, the intent is to warm the fluid depicted as being present within pipe 57 when that fluid is static in the column. Further discussion of the warmed fluid flowing from the solar collector through pipe 58 will be discussed below.

Continuing now with the fluid flow of water 41-1, the water 41-1 is subjected to a second stage heating in the thermal booster 56. Upon egress from the thermal booster 56 it will have been subjected to two stages of warming and is now designated 41-2. This water then enters the DHWH 50 at the bottom thereof, exiting through pipe 501, lower outlet 502. After being heated conventionally, i.e. by gas or electricity, as water 41-3 it emerges at the top of the DHWH 50 through outlet 503 and passes through piping 52 to the various rooms of the structure as hot water, now designated 44.

One modification required by this invention is the insertion of a small opening 504 in pipe 501 near the top of pipe 501 to also permit fluid in pipe 501 to enter the top area of DHWH 50, rather than only through the bottom at 502 as is conventional (see infra).

Within this pattern of fluid flow, it is also seen that an optional tempering valve 59, which is a T-valve, having two inputs and one output to allow cold water 41 flowing in line 51 to be diverted in part through line 60 to said valve 59 with which it is in fluid communication. Thus if the temperature of the hot water is too high it can be reduced to the degree desired.

It is further to be seen pipe line 53 fluidly communicates between the bottom of the DHWH 50 and the incoming cold water line 51. A one way check valve 54 is interposed on this line to permit fluid flow only of relatively warm water, i.e. 41-2 water from the bottom of the DHWH through the valve 54 to mix with fully cold water 41 at the junction of lines 51 and 53 as the cold water 41 enters the heat exchanger coil 32. Valve 54 can be either a manually controlled check valve or an automatic check valve. A suitable automatic check valve for this purpose has been disclosed and claimed in our co-pending application U.S. Ser. No. 07/618875 filed Nov. 28, 1990, U.S. Pat. No. 5,046,526.

All of the second stage heating depends upon heat from the thermal booster 56. The question then arises as to what is the source of the extremely hot water entering through line 55 into the heat exchanger 56. As depicted here, the original water to be acted upon by the solar collector 20 comes from the non-pressurized tank 30 through line 35 which fluidly communicates from the bottom of the tank to the inlet 21 of solar collector 20.

The next discussion is pertinent to FIG. 2. Cold water 141 flows to the inlet 21 of conventional solar collector 20 from the bottom of the storage tank via lines 35 and 38. This prevents tank 30 from overflowing. In line on this line is the first of two similar pumps, 39A, 39B. Pump 39A pumps water from the bottom of the non-pressurized tank to the solar collector, which ofttimes is elevated relative to the tank and angled, even if only minimum. Also in line with solar pump 39A are a thermometer 68 and a flowmeter 70.

Another outside source of cold water 41 (as from another tap or well) can be utilized in addition to or as an alternative to water 141 coming from line 35 out of the bottom of the tank. To do so would require a piping modification however. Water flows through the various sections of the collector, which are shown here arbitrarily as being six in number and designated 20A through 20N. Solar heated water designated as 40 exits the collector at outlet 22 and flows through line 55 to the inlet of the thermal booster 56, previously discussed.

It is also to be seen that if the storage tank 30 is in an extremely cold environment, one may choose to try to elevate the temperature of the water at the bottom of the tank by providing a loop through a firebox or some other continuous flow fluid heater. Thus line 35 is seen to be in fluid communication with line 35A which leads to and through a wood burning fire box 37. The loop is continuous and separate. Since the water therein is of a different temperature, the exit side of this loop is designated 36, and this side communicates with the middle or intermediate elevation of the storage tank for re-delivery of fluid thereto. See FIG. 2. Also in place on line 35A are pump 39B used to pump fluid through the aforementioned route of tank- firebox- tank and optional thermometer 68 and flowmeter 70.

Since the supplementary heat source namely the wood stove is still in the system, the top of the water in the tank 30 is relatively warmer than the water at the bottom of the tank. In fact, this last would be true even if the wood stove 37 were not present since heat rises according to the laws of physics. Thermal siphon inner tube 57 still draws water from the top part of the tank to feed the EOGHWH. The remainder of this system is the same as that of FIG. 2. Thus within the loop of cold in 41, hot out 42, there are only two heating stages in this variant, while in the basic system there are three heating stages.

Figure 3:
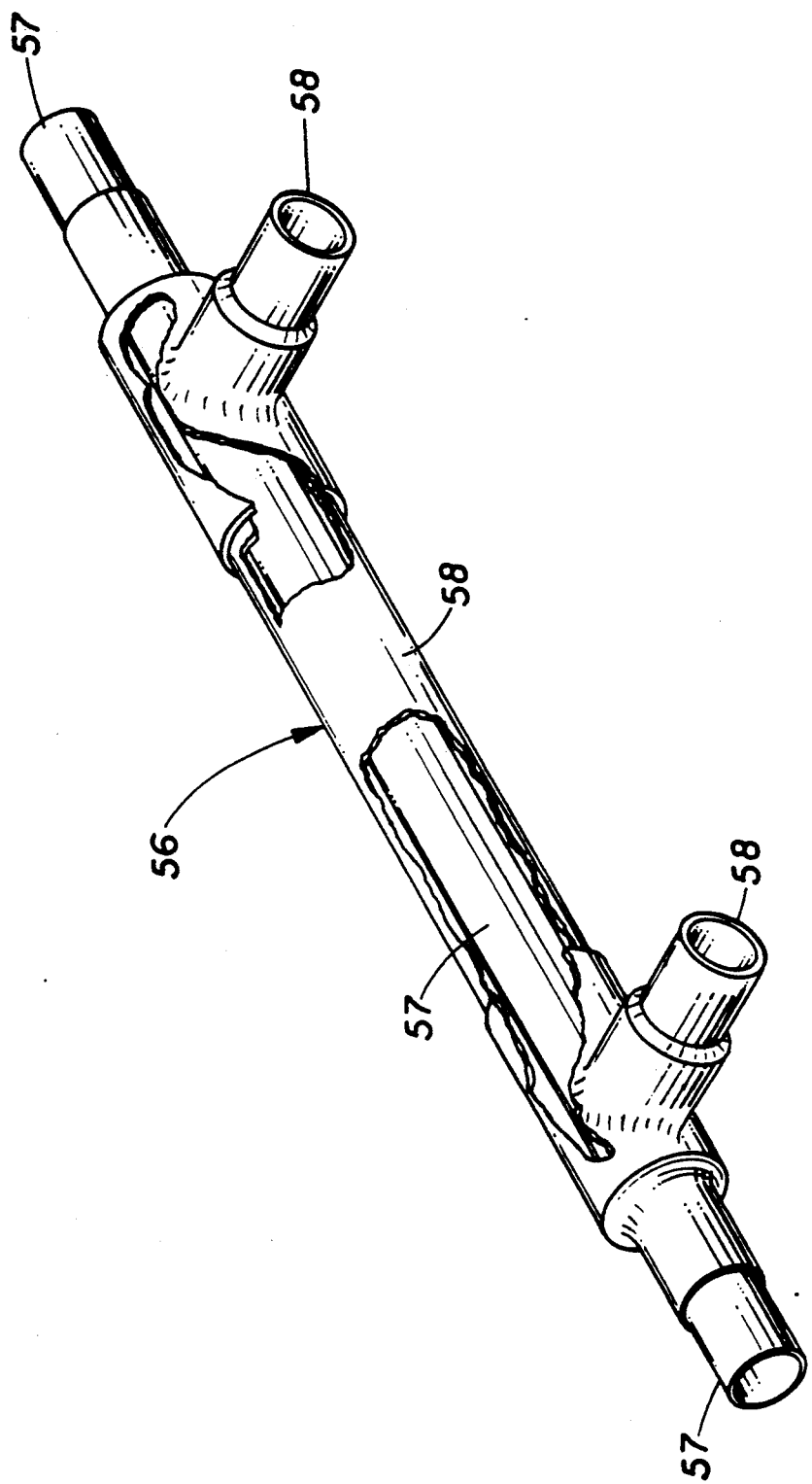
FIG. 3 is a cutaway perspective view of the thermal siphon of this invention.

FIG. 3 illustrates a typical construction for the thermal siphon shown in FIG. 2. Such a siphon may be made of copper or any other material having a high heat conductivity. In the unit illustrated here, the outer pipe 58 enters and egresses angularly (here at 90 degrees) the cooling area of the thermal siphon heat exchanger 56. The flow through pipe 57, which is the one bearing the cooler fluid in this invention, is seen to have a linear entrance and exit. The operating principle of heat transfer or cold transfer through the wall of separation between the two tubes is well known in the art and requires no further discussion.

It is seen that the stove 37 is to be considered an accessory to the system since it is not a part of the cold water in / hot water out loop. Additionally, the system of this invention provides 10 to 15 per cent additional efficiency by adding the extra heating stage of warming the water going into the DHWH from the solar storage tank.

All of the components employed herein are readily available in the marketplace from various vendors. Thus the system of this invention can be built easily and at reasonable cost.

The system of this invention has as its best attribute the fact that it significantly reduces standby heat losses of the DHWH both in winter and summer.

Let us now turn to the operation of this invention.

For ease of operation and cost reduction, the DHWH is often physically disposed at a higher elevation than the storage tank, frequently on top of the storage tank on a platform.

OPERATION

The keys to this invention are the coil heat exchanger 32 and the thermal booster 56 which work in conjunction with the modified DHWH. The modification referred to is aperture 504 in the DHWH 50 and the check valve 54 shown in FIG. 2.

While it would appear that the thermal siphon 56 would transfer heat to water flowing from the coil 32 upwardly via line 34 and 58 into the DHWH 50 such is not the case, I have found, due to the rapid flow of the upward moving water 41-2. There is inadequate dwell time within the column for any real equalization to transpire. Only a minuscule temperature change happens.

The thermal siphon 56's main functionality is transfer heat to water 41-2 that is languishing or resting within the jacket during periods of nonuse of any hot water faucets 66. For the sake of this discussion any and all hot water faucets will be designated 66 since the usage of any one or all causes certain actions to transpire within the system.

Now let us consider the fluid flow that transpires on a sunny day with the solar collector in operation, when one turns the faucet 66 to the on position. We must remember that the DHWH always maintains a relatively constant volume, such that as hot water 44 exits faucet 66, water removed is being replenished in the DHWH, 50.

Thus let us now consider the fluid flow pattern when little Johnny turns on the faucet 66 to wash his hands with hot water.

Cold water 41 from the street enters line 51 which is in communication with line 33 to feed this cold water to the coil 32. Here it is warmed a bit as water 41-1 due to the presence of and inward continued receipt of water 42 from the thermal booster. See the droplet 42 from the thermal booster outer jacket 58 into tank 50. The water 41-1.5 exits at about 90° in line 34, having gained heat from water 42 which was on the order of 100° F+ as it came down from the collector 20 and through the booster 56.

Water 41-1.5 changes designation to 41-2 while in the booster, but due to its rapid movement through the booster little or no temperature change takes place as it moves via line 58 into tank 50 for ultimate delivery via outlet 503 and line 52 to faucet 66 as hot water 44 at about 140° Fahrenheit.

One must remember that an aperture 504 spaced down from 5 inches to 10 inches from the point of entry of the inlet pipe 501 into the top of heater 50 Was made in the pipe 501 which is disposed in the DHWH. Since the draw of hot water is from the top outlet 503, this water coming in wants to replace what is being lost, thus as hot goes out the top at 503, replacement fast moving water rushes down pipe 501 and out 502 into the DHWH bottom.

Let us contrast that above with what happens when the faucet 66 is off and the solar collector is still functioning. We pick up with water 41-2 which is standing within the booster 56. Normally it, 41-2 would not move to the DHWH until a faucet 66 were turned on.

For the sake of discussion We will assume that water 42 exiting the collector into the thermal booster is at 115°-120° F. We also assume based on general knowledge that the water in the bottom of the DHWH, —said water being labelled 43—is the relatively coldest water in the DHWH at about 110°-115° F.

We see therefore that the temperature of the water in booster 56 is hotter than at the bottom of the DHWH for water 43.

Since faucet 66 is off, this water 43 if it were to move, can only move out line 53 through one-way valve 54 to the coil inlet 33.

A thermal siphon effect is created in that relatively hot but still water 41-2 in the booster moves at the about 120° F. into pipe 501. But since force of the faucet's operation is not present, the water in small quantities exits via the small ¼" aperture 504 instead of keeping on going down pipe 501 to outlet 502. But the DHWH only has a finite volume, so the relatively colder 43 which was at 110° or so exits out the bottom via check valve 54 into the coil, going round and round so long as the solar unit is in operation, to raise the temperature of the "stagnant" water 41-2. This siphoning effect has the effect of causing the still or latent water 41-2 to move to DHWH tank bottom to raise the temperature of the water at the bottom of the DHWH. The result being that less BTU's are needed to raise the temperature of the water within the DHWH to 140° F. because the average temperature of the DHWH's reserve is higher to start off.

Therefore when the faucet is opened again less water will need to be run until hot water at 140° comes out faucet 66 because all the water within the DHWH 50 is all relatively warmer than in a conventional solar aided DHWH system.

As the day progresses and the solar water continues to rise to for example 165° F., the stock water in the DHWH will also continue to get hotter due to operations of the siphoning effect during periods of no faucet usage.

It is seen therefore that during periods of nonoperations of faucets 66 that there is indeed a direct contribution by the solar unit of calories to the DHWH. It is known that DHWH be they electric or gas have a standby heat loss of 15% or more. The siphon effect just described tends to overcome this heat loss. The siphoning effect of the water moving around and around stops when the temperature in the thermal booster 50, i.e. solar heated water 40 is no longer greater than the temperature of water 43 at bottom of the DHWH.

Another advantage of this system is that on hot sunny days when the solar heated water 42 reaches 160° F., the temperature of the water resident in the DHWH will also be about 160° F. due to the just described siphoning effect.

The reader's attention is called to the fact that the cold water 41 cannot directly enter into tank 30 due to the pressurization difference. The cold water is under 50 PSI or so from the city or other source while storage tank 30 is vented to the atmosphere. The pressure would be lost and thus there would be no way to force water up through the coil 32. Instead, as more street water 41 came in, storage tank 32 would merely overflow at the top.

On the other hand storage tank 30 needs to be unpressurized to ensure the drainage of the solar system 20. Thus reference to FIG. 2 reveals that city water 41 never gets into the storage tank 32 per se only into the contained coil 32.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A solar based domestic hot water system comprising:
   a) a columnar heat exchanger defining a thermal booster having two columns, an inner column and an outer column in annular relationship, one column of which, the first column, has an inlet connected in fluid communication with an outlet of a solar collector on one end and is in fluid communication on the other end with,
   b) a non-pressurized water storage tank; said tank having an outlet for the egress of cold water to a solar collector, connected to the inlet or said collector;

c) a solar collector having an inlet and outlet; the outlet of said collector is in fluid communication with the first column of said columnar heat exchanger, while the inlet is in fluid communication with the outlet of said tank;

d) an electric or gas domestic hot water heater, said heater having a top and a bottom, and said heater having an inlet pipe in fluid communication with an outlet end of the heat exchanger's second column; and having an outlet in fluid communication with the plumbing of a structure's hot water faucet(s) for delivery of hot water to the structure;

said hot water heater's inlet pipe extending down into said hot water heater through the top thereof, terminating near the bottom thereof, and including a small bore spaced down from the point of entry near the top of said inlet pipe;

said heater also having an outlet at the bottom thereof;

and wherein the other end of said second column is in fluid communication with a water source for ultimate introduction into the inlet pipe of said heater.

2. In the system of claim 1 wherein solar heated water passes downwardly through the thermal booster and water passes upwardly through the thermal booster to the heater.

3. In the system of claim 2 further including a coil heat exchanger having an inlet and outlet, which exchange at exchanger is disposed in said tank and connected at its inlet end to a cold water inlet source, and connected at its outlet to the second column of said columnar heat exchanger.

4. In the system of claim 3 wherein the cold water inlet source fluidly communicates with the coil heat exchanger at about the midpoint of the elevation of said storage tank.

5. In the system of claim 3 wherein the heater's outlet disposed at the bottom thereof is in fluid communication with a cold water inlet source.

6. In the system of claim 5 wherein a one way check valve is interposed in the communication between the outlet disposed at the bottom of said tank and the cold water inlet source.

7. In the system of claim 3, including a T-valve having three connecting points, one inlet and two outlets, placed in line between the fluid communication between the outlet of the heater and the hot water plumbing of the structure, and connected to said T at the second outlet thereof is a line fluidly communicating with a cold water inlet source.

8. In the system of claim 3 further including a pump in line in the fluid communication between the storage tank and the inlet of the solar collector.

9. In the system of claim 1, wherein the heater has an outlet disposed at the bottom thereof in fluid communication with a cold water inlet source.

10. In the system of claim 9 wherein a one-way check valve is interposed in the communication between the outlet disposed at the bottom of said tank and the cold water inlet source.

11. In the system of claim 1 including a T-valve having three connecting points, one inlet and two outlets, placed in line between the fluid communication between the outlet of the heater and the hot water plumbing of the structure, and connected to said T at the second outlet thereof is a line fluidly communicating with a cold water inlet source.

12. In the system of claim 1 further including a pump in line in the fluid communication between the storage tank and the inlet of the solar collector.

13. In the system of claim 1 further including a supplementary heat source such as but not limited to a wood stove, in a separate circular fluid communication with the storage tank.

14. In the system of claim 13, further including a pump to pump fluid to said supplementary heat source.

15. In the system of claim 1 further including: e) a coil heat exchanger disposed in said storage tank, one end of which is in fluid communication with an inlet water source, the other end of which is in fluid communication with the inlet end of said second column.

* * * * *